US006499660B1

(12) United States Patent
Moorhouse et al.

(10) Patent No.: US 6,499,660 B1
(45) Date of Patent: Dec. 31, 2002

(54) OPTICAL SECURITY SYSTEM

(75) Inventors: John H. Moorhouse, P.O. Box 236, Clear Lake, MN (US) 55319; Michael A. Bodin, Champlin, MN (US); Kurt Larsen, Rockford, MN (US)

(73) Assignee: John H. Moorhouse, Minnetonka, MN (US)

( * ) Notice: Subject to any disclaimer, the term of this patent is extended or adjusted under 35 U.S.C. 154(b) by 0 days.

(21) Appl. No.: 10/057,598

(22) Filed: Jan. 24, 2002

(51) Int. Cl.[7] .................................................. G06K 7/10
(52) U.S. Cl. ....................................... 235/454; 235/382
(58) Field of Search ................................ 235/454, 382

(56) References Cited

U.S. PATENT DOCUMENTS

| | | | |
|---|---|---|---|
| 541,630 A | | 6/1895 | Ridgway |
| 1,619,252 A | | 3/1927 | George |
| 2,008,150 A | | 7/1935 | Nelson |
| 2,111,098 A | | 3/1938 | Segal |
| 2,145,085 A | | 1/1939 | Heyer |
| 2,222,027 A | | 11/1940 | Golden |
| 2,618,957 A | | 11/1952 | Tonnessen |
| 3,197,985 A | | 8/1965 | Cosio |
| 3,260,082 A | | 7/1966 | Bodek |
| 3,380,268 A | | 4/1968 | Perrill |
| 3,411,331 A | | 11/1968 | Schlage |
| 3,422,646 A | | 1/1969 | Monahan |
| 3,648,492 A | | 3/1972 | Walters |
| 3,728,880 A | | 4/1973 | Falk |
| 3,738,136 A | | 6/1973 | Falk |
| 3,783,660 A | | 1/1974 | Gill |
| RE28,319 E | | 1/1975 | Kerr |
| 3,885,409 A | | 5/1975 | Genakis |
| 3,889,501 A | | 6/1975 | Fort |
| 3,903,720 A | | 9/1975 | Scherbing |
| 3,916,657 A | | 11/1975 | Steinbach |
| 4,012,931 A | | 3/1977 | Harunari |
| 4,041,739 A | | 8/1977 | Mercurio |
| 4,068,509 A | | 1/1978 | Genakis |
| 4,090,175 A | | 5/1978 | Hart |
| 4,143,530 A | | 3/1979 | Murtezov |
| 4,194,378 A | | 3/1980 | Swindler |
| 4,222,252 A | | 9/1980 | Tietz |
| 4,233,828 A | | 11/1980 | Dauenbaugh |
| 4,322,719 A | | 3/1982 | Moorhouse |
| 4,593,185 A | | 6/1986 | Patzelt |
| 4,653,297 A | | 3/1987 | Moorhouse |
| 4,802,354 A | * | 2/1989 | Johnson ...................... 235/454 |
| 4,838,060 A | | 6/1989 | Hutzenlaub |
| 5,018,376 A | | 5/1991 | Lee |
| 5,060,494 A | | 10/1991 | Moorhouse |
| 5,552,587 A | | 9/1996 | Moorhouse |

FOREIGN PATENT DOCUMENTS

| | | |
|---|---|---|
| GB | 2161636 | 1/1986 |
| SU | 1008397 | 3/1983 |

OTHER PUBLICATIONS

"Abloy Disklock Pro", Sal Dulcamaro, *The National Locksmith*, Nov. 2001, pp. 16–25.

* cited by examiner

*Primary Examiner*—Harold I. Pitts
(74) *Attorney, Agent, or Firm*—Patterson, Thuente Skaar & Christensen

(57) ABSTRACT

The present invention relates generally to an optical security system having a key, an optic lock, and a processing system. The lock generally has a plurality of optic reflective sensors, a plurality of readable discs, and a controller for processing information to and from the plurality of sensors. The optic security lock senses the surface changes of state during the rotation of the plurality of discs caused by the turning of the fully-engaged key. The data from the sensors is communicated to the controller, with the controller having a microprocessor capable of communicating data to and receiving data from the sensors. The processing system analyzes the data from the controller and compares the data to known information in a database for generating a lock command signal. Additionally, an external keypad device can be coupled in data communication with the controller and processing system for additional security verification before generating a corresponding lock command signal.

31 Claims, 15 Drawing Sheets

OPTICAL SECURITY SYSTEM

FIELD OF THE INVENTION

The present invention relates generally to security, and more particularly, to an optical security system capable of sensing and counting the rotatable movement of lock discs and generating a lock command signal.

BACKGROUND OF THE INVENTION

Traditionally, key locks have been the most commonly used and understood lock systems available. Conventional key lock systems comprise a lock and a corresponding key. Each lock has a key cut to match the specific internal tumblers or wheels of the lock such that only that key will properly align and open the lock. Key blades are cut to predetermined shapes to facilitate proper engagement with a corresponding lock. However, there are fundamental drawbacks to such systems. Namely, there are a limited number of cut configurations for a particular key, thus limiting the number of lock and key combinations that can be manufactured. As a result of this limitation, it is generally accepted that only several thousand distinct lock and key combinations are available in such conventional lock systems. Once that limit has been met it is necessary to recycle the known combinations. This can obviously result in unacceptable results and security vulnerabilities.

Even those conventional lock systems that have attempted to expand on the number of potential key and lock combinations have not achieved the level of success required in those areas of use where security is of the highest priority. Credit card security, home safety, personal safety, and concerns over the like have become central issues. As a result, some attempts have been made to find alternatives to conventional lock systems.

A prime example of an alternative to conventional lock systems that has become quite popular, and has found widespread use, is the identification or security card having a magnetic strip. These cards resemble the traditional credit card configuration. Information or magnetic data is stored on the strip. In use, these cards can include various security, personal, identification, and a myriad of other data that enables a device, such as a simple card reader, to make a nearly endless array of discriminatory decisions. In the area of security, these decisions can compare names, citizenship, dates of birth, code numbers, and other information on the magnetic strip with information in the devices memory, or in the memory or database of an external device in communication with that device, such that only a qualified card is considered acceptable. These card systems have become increasingly popular with hotels, industries, and even homeowners to better secure facilities. However, there is at least one major drawback to these systems.

Accepted card systems require the storage of magnetic data. This data is easily erasable, whether intentionally or unintentionally. Magnetic sources independent of the card can come into direct or proximal communication with the card, thus erasing the data kept on the strip. In addition, it is possible to utilize a false card reading device to extract the security, identification, and other data on the card, thus permitting an unauthorized and undesirable individual to obtain the sensitive data.

U.S. Pat. No. 5,552,587 (the ’587 patent), issued to and owned by this applicant, addresses the inherent weaknesses of existing security devices and systems. The ’587 patent is directed to a tubular key which rotates discs, whereby the rotation of the discs are read by a relatively complex fiber optic system. The counting results are fed to an external computer for processing. While the device described in the ’587 patent is a vast improvement over past technologies and techniques, it is not without inherent problems. First, the fiber optic and corresponding circuitry generates undesirably high heat levels. Second, fiber optic technology requires cumbersome and time consuming calibration. Similarly, slight deviations in the optic alignment of the components from the desired calibration alters optic readings and corresponding accuracy of the units. As a result of deviations, additional calibrations are necessarily required. Third, processing functions for the lock claimed in the ’587 patent are not housed locally with the lock, but rather are remotely housed. With none of the processing taking place locally at the lock, the overall efficiency of the unit is reduced and the costs become increasingly undesirable.

In addition to the cost of the fiber optic components and processing techniques, there are additional manufacturing costs associated with such a system. Precision manufacturing is required. Fiber optic systems require passageways through the lock components, such as the discs of the lock, such that light is permitted to pass through for reading by an optic component at one end of the opening. This necessitates highly precise tolerances in order to ensure that the light passageways are functionally sound to permit proper optical readings. Each of these requirements are necessary for the lock of the ’587 patent to properly function. Undesirable manufacturing and configuration costs relating to both the lock components and the fiber optic components are an unfortunate, but necessary, barrier under such a fiber optic lock system.

Consequently, a security system is needed that will address many of the problems associated with current systems. The gross inadequacies of conventional locks, and the problems associated with fiber optic systems, must be avoided in providing a security system that can be manufactured, configured, and maintained at a reasonable cost. At the same time, increased security must be of the highest priority.

SUMMARY OF THE INVENTION

The optical security system in accordance with the present invention substantially solves the problems associated with traditional locks and lock systems, as well as the problems inherently present with fiber optic security locks. The present invention generally provides for a solid state optic lock system utilizing reflective infrared sensors for reading the rotational movement of a plurality of rotatably secure discs or wafers. The optic security system of the present invention generally employs standard electronic solid state components to minimize the manufacturing and configuration costs of the system. In addition, the use of these standard components permits simplified manufacturing and configuration for the lock components and, in particular, the discs being optically read by the system.

The present invention relates generally to an optical security system having a key, an optic lock, and a processing system. The lock generally has a plurality of optical reflective sensors, a plurality of readable discs, and a controller for processing information to and from the plurality of sensors. The optic security lock senses the surface changes of state during the rotation of the plurality of discs caused by the turning of the fully-engaged key. This results in a possible combination count of at least 24.9 billion. The data from the sensors is communicated to the controller, with the controller having a microprocessor capable of communicating data to and receiving data from the sensors. The processing system analyzes the data from the controller and compares the data to known information in a database for generating a lock command signal. The processing system can be encompassed within the controller-based microprocessor, or in an external remote processing device. The external remote processing device can be coupled in data communication with the controller for processing the data obtained from the lock, and for generating a corresponding lock command signal. Additionally, an external keypad device can be coupled in data communication with the controller and processing system for additional security verification before generating a corresponding lock command signal.

It is possible to use the optical security system of the present invention to monitor and control access into private homes, commercial buildings, hotels, and the like. In addition to these entrance control applications, the system of the present invention can be utilized in any application where security verification is required. For instance, credit card access and computer terminal or program access can be controlled by requiring an unlock lock command signal prior to granting permission. Any of the access or entrance requirements can be predicated on the a requirement that a proper PIN be entered into the operable keypad, in addition to the proper rotation of an acceptable key within the optical security lock. Consequently, the lock command signal can be a signal to a security system or door lock, or it can be a signal to another computing or processing device, such as those used in processing credit card purchases or program access at a computer terminal. Further, the optical security system, and the processing system in particular, can be used to keep track of key usage, last use, number of uses by a user or key, and the like. This type of processed and stored data can be used for controlling the system, interpreting access or usage requests, and a myriad of other uses.

DETAILED DESCRIPTION OF THE PREFERRED EMBODIMENTS

Optical Security Lock

Figure 1:
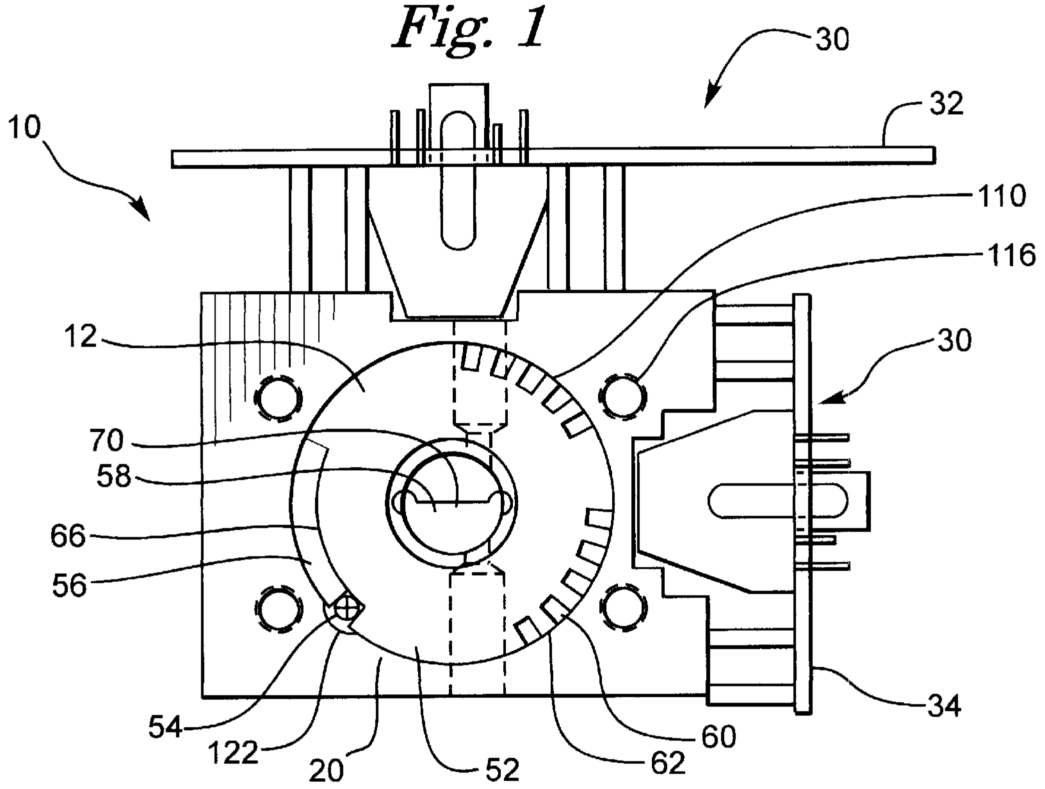
FIG. 1 is a front view of an optical security lock embodiment in accordance with the present invention.
Figure 7:
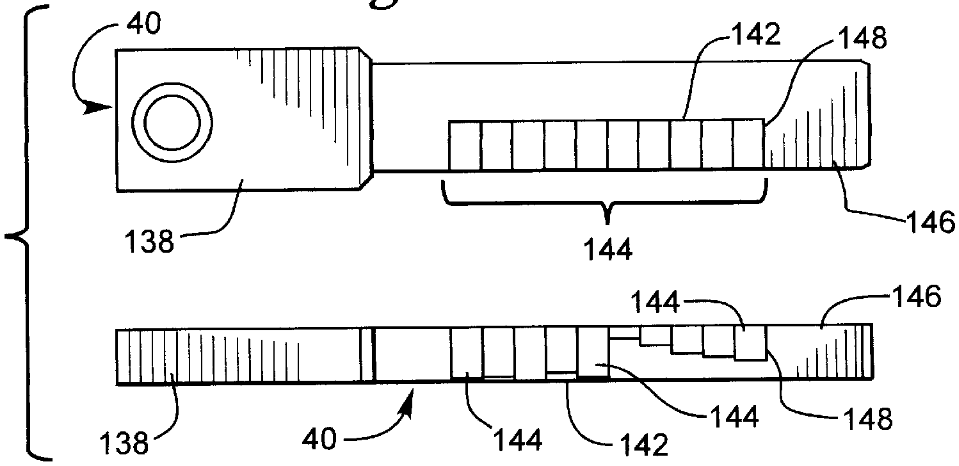
FIG. 7 is a key for use in accordance with the present invention.
Figure 12A:
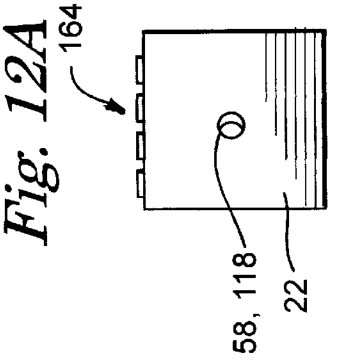
FIG. 12A is a side view of a system housing and a keypad in accordance with the present invention.
Figure 12B:
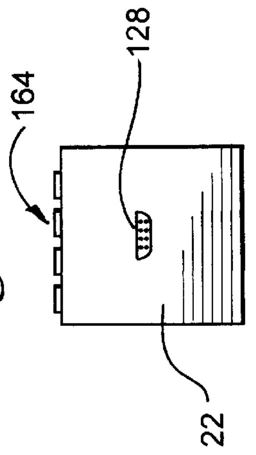
FIG. 12B is a side view of a system housing, a keypad, and a communication port in accordance with the present invention.

Referring to FIG. 1, an optical security lock 10 in accordance with the present invention is shown. The lock 10 generally includes a lock assembly 12, a lock housing 20, and a controller 30. In addition, there is at least one key 40, as shown in FIG. 7. The lock assembly 12, lock housing 20, and controller 30 are preferably housed within a system housing 22. The system housing 22 is shown in FIGS. 12A–12B.

Figure 2:
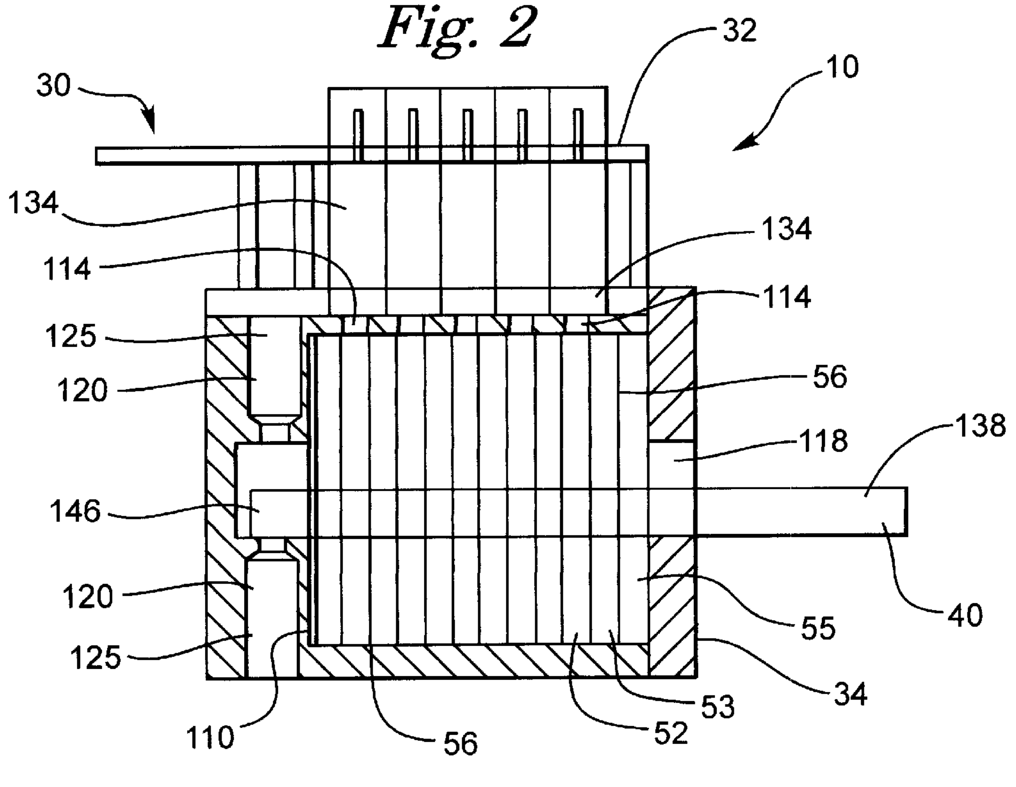
FIG. 2 is cross-section view of an optical security lock embodiment in accordance with the present invention.
Figure 3:
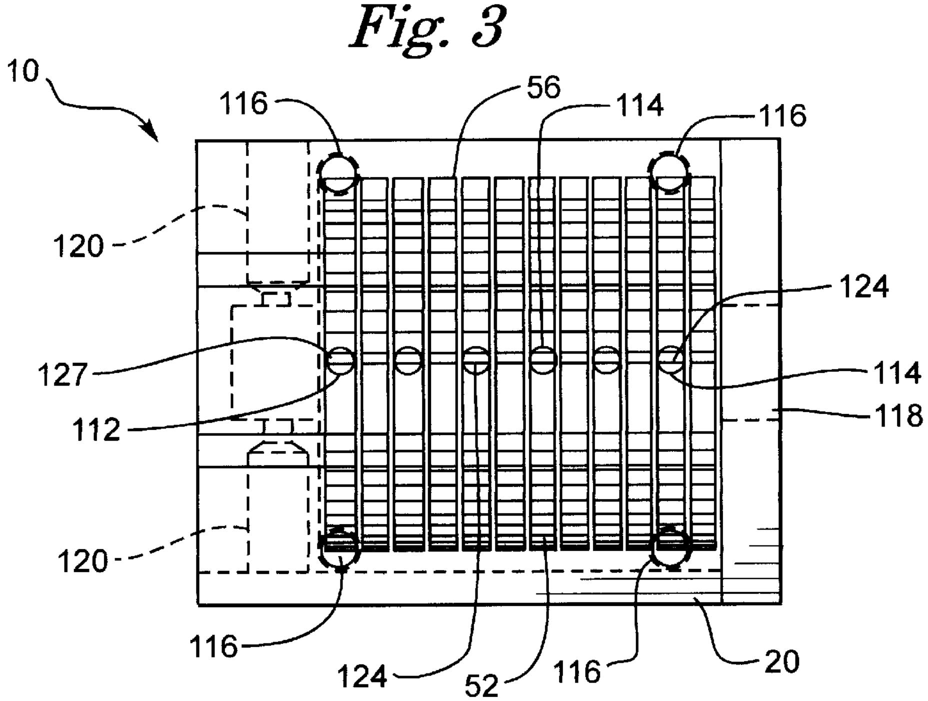
FIG. 3 is a cut-away view of the lock assembly and lock housing of an optical security lock in accordance with the present invention.
Figure 4:
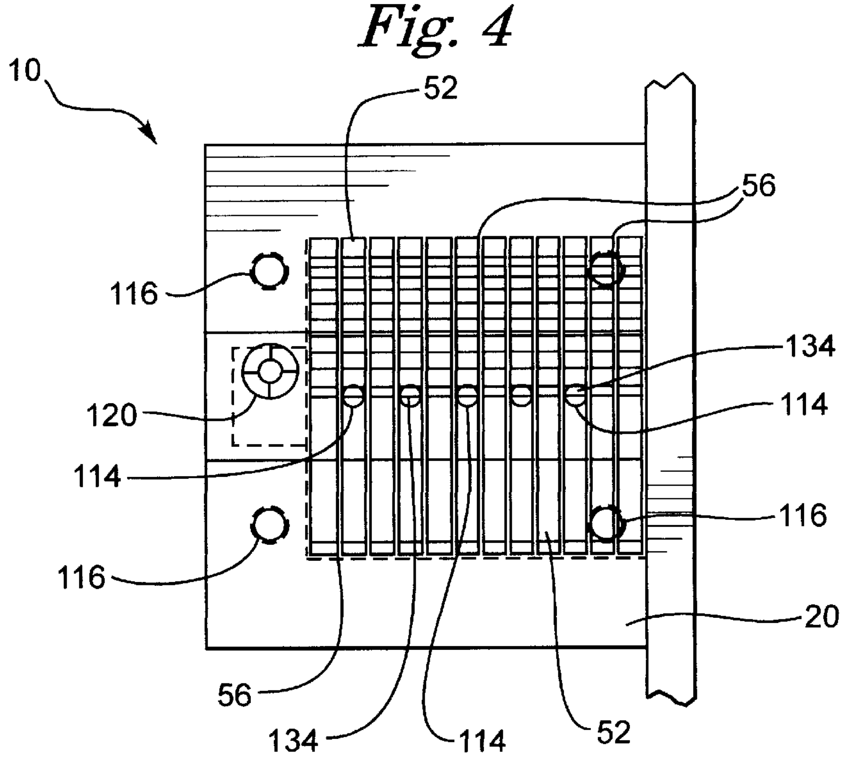
FIG. 4 is a cut-away view of the lock assembly and lock housing of an optical security lock in accordance with the present invention.
Figure 5:
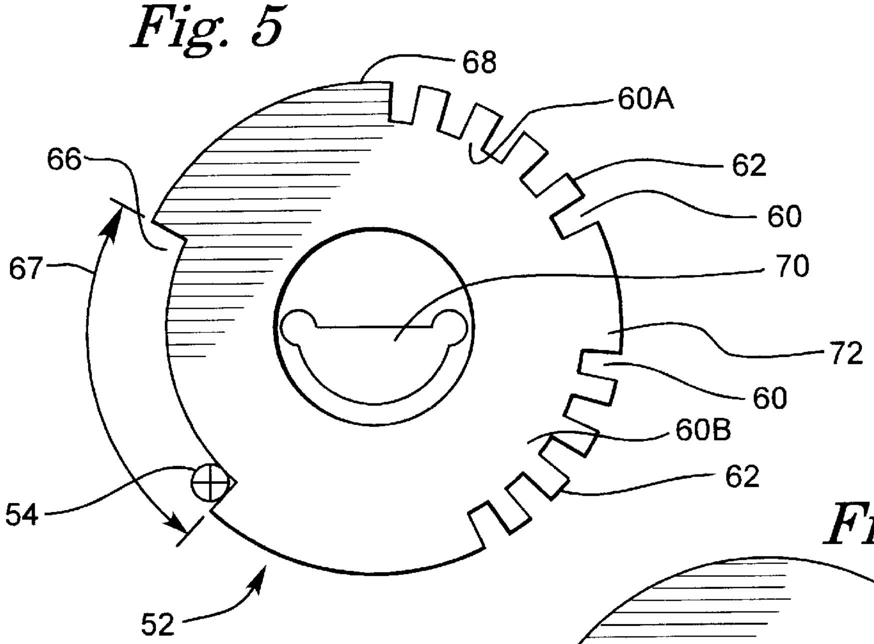
FIG. 5 is a rotatable disc or wafer for use in an optical security lock in accordance with the present invention.

Referring to FIGS. 1–6, the lock assembly 12 includes a plurality of rotatable discs 52, a stop pin 54, a plurality of spacing washers 56, and a key insertion aperture 58. Each of the plurality of discs 52 include a plurality of notches 60, a plurality of lands 62, a defined motion groove 66, a circumferential surface 68, an inner aperture 70, and an intermediate separation portion 72, as best shown in FIG. 5. There are preferably 11 discs 52 made of aluminum, the aluminum material having innate light reflective qualities. These qualities can be enhanced by providing for polished aluminum. 10 of the discs are utilized for combination counts, with the $11^{th}$ disc 53 serving as a rotation count disc 53. While this disc 53 is shown in FIG. 2 as being assigned to one particular disc of the plurality of discs 52, it is envisioned that there are numerous discs of the plurality of discs 52 that could qualify and be appropriately designated as the rotation count disc 53. In addition, and as shown in FIGS. 2–4, there can be a spacer disc 55 that simply serves a spacing function to fill space within the housing 20, thus providing for a $12^{th}$ disc. Multiple spacing discs 55 can be utilized, or it is envisioned that this disc 55 can be completely removed to only permit the use of the 11 discs 52.

The notches 60 are adjacently followed by the corresponding lands 62 to define a series of peaks and valleys referred to as readable changes of state. The changes of state are defined by the special reflective differences between each notch and corresponding land as will be disclosed in greater detail herein. The notches 60 are anodized such that the reflective properties of the surface of the notches 60 are significantly minimized. Each of the lands 62 are without this coating or film whereby the lands 62 have the same surface reflection characteristics as the discs 52 and the circumferential surface 68.

Referring again to FIG. 5, the plurality of notches 60 are preferably divided into a first group 60A and a second group 60B. The first group 60A and second group 60B are separated by the intermediate portion 72 of each of the discs. Preferably, the groups 60A, 60B are of equal number with each group having 5 notches and 5 lands, for a total of 11 changes of state per group.

Figure 6:
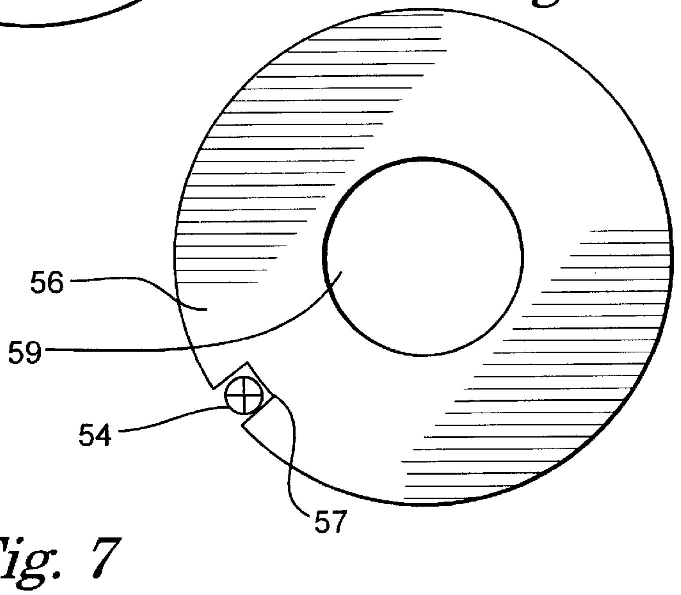
FIG. 6 is an intermediate washer for use in an optical security lock in accordance with the present invention.

Referring to FIG. 6, the spacing washers 56 have substantially the same outer diameter as that of the discs 52. The washers 56 also have a washer aperture 59 some size larger than the inner aperture 70 and a single depression 57 that is just larger than the diameter of the pin 54. The washers 56 are thinner than the discs 52 and are to serve as buffers between the discs 52. It is preferred that the washers 56 be made of a thin opaque non-reflective plastic material. Other acceptable materials are envisioned as well.

Still referring to FIGS. 1–6, the groove 66 of each of the discs 52 and the depression 57 of the washers 56 are sized for rotatable securement around the pin 54. Preferably, the discs 52 and the washers 56 are secured to the pin 54 in an alternating stacking manner with each washer being followed by a corresponding disc until a total of 11 washers and 11 discs are rotatably secured. The depth of the groove 66 and the depression 57 are approximately equal to the diameter of the pin 54. The circumferential arc length 67 of the groove 66 is a percentage of the total circumferential distance of the discs 52. This percentage is dependent upon the desired rotatable movement of the discs, whereby the pin 54 stops the rotation of the discs 52 at each end of the groove 66. Preferably, the circumferential arc length 67 of the groove 66 of each of the discs 52 is a distance permitting each of the lands 62 and notches 60 of each of the groups 60A, 60B to pass substantially through a single point of reference for each of the groups 60A, 60B upon a complete rotation of the discs 52 along the groove 66. Such preferred movement permits corresponding sensors to read exclusively from one group of notches 60 and lands 62, and consequently, to sense distinct changes of state data for each group.

The sequential securement of the discs 52 and washers 56 to the pin 54 results in the alignment of the inner apertures 70 of the discs 52 and the washer apertures 57 of the washers 56, thus defining the boundaries of the key aperture 58 for insertion of the at least one key 40.

As best shown in FIGS. 1–3, the lock housing 20 generally has a lock chamber 110, a count aperture 112, sensor apertures 114, mounting apertures 116, a key opening 118, a trigger 20 aperture 120, and a pin groove 122. The lock chamber 110 is sized for rotatable resting securement of the stacked discs 52. The discs 52 are contained while still able to rotate, as is discussed herein. The mounting apertures 116 enable mounting of the lock housing 20 to the system housing 22, and permit the mounting of various boards, the controller 30, and the like. Mounting apertures 116 are available on at least two sides of the housing 20. The trigger aperture 120 defines a light communication channel at one end of the lock chamber 110, with the channel of the trigger aperture 120 extending out through both sides of the chamber 110 for use by a corresponding key trigger sensor 125. The pin groove 122 rotatably secures the ends of the pin 54 within the lock housing 20 whereby the rotation of the discs 52 and washers 56 is contained around the circumference of said pin 54.

Figure 8:
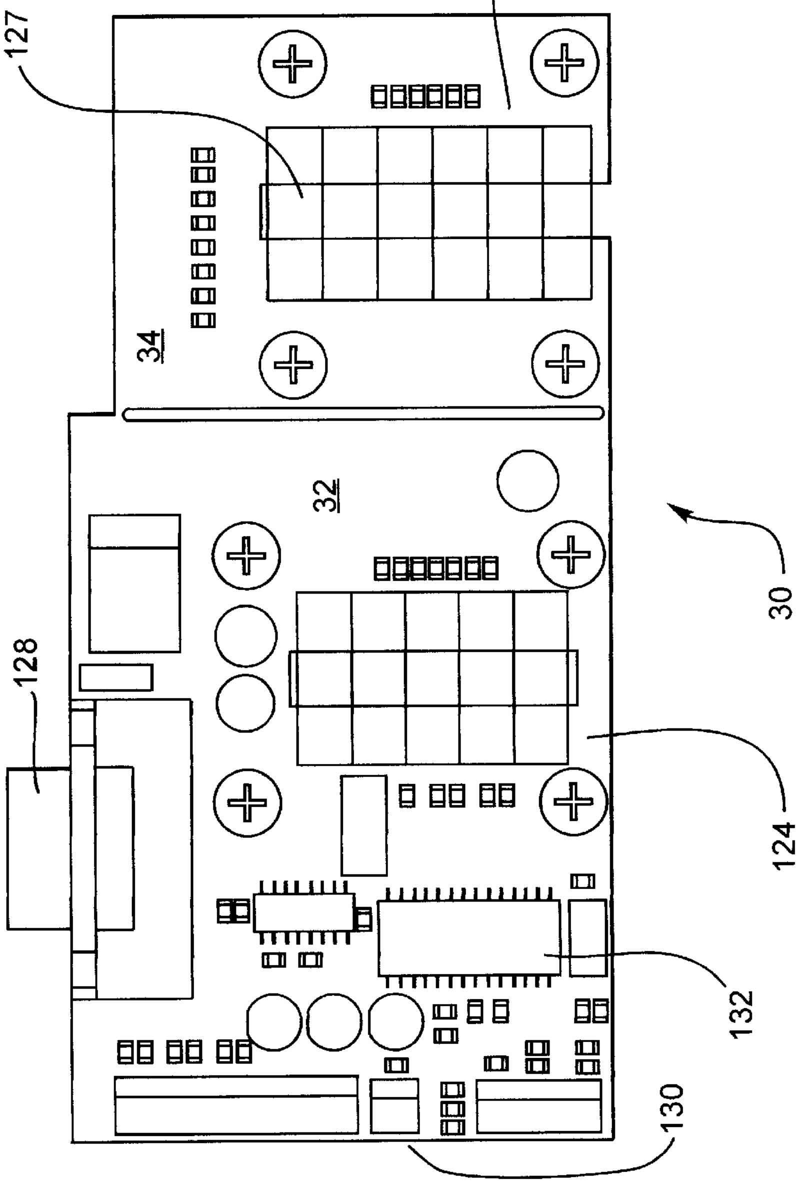
FIG. 8 is a circuit board diagram of a controller in accordance with the present invention.
Figure 9A:
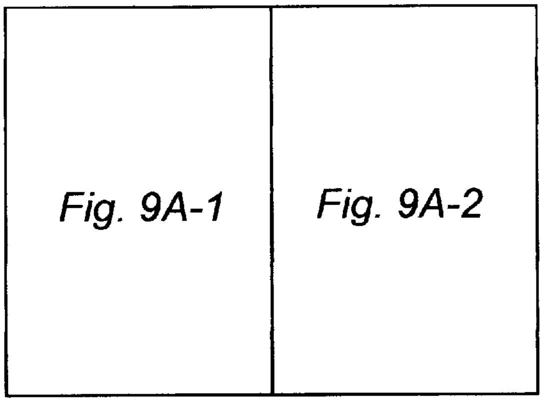
FIGS. 9A–9C combined is a partial circuit diagram for a controller in accordance with the present invention.
Figure 9B:
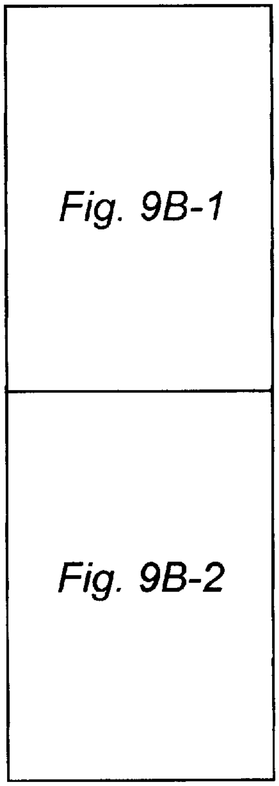
Figures 1, 9A:
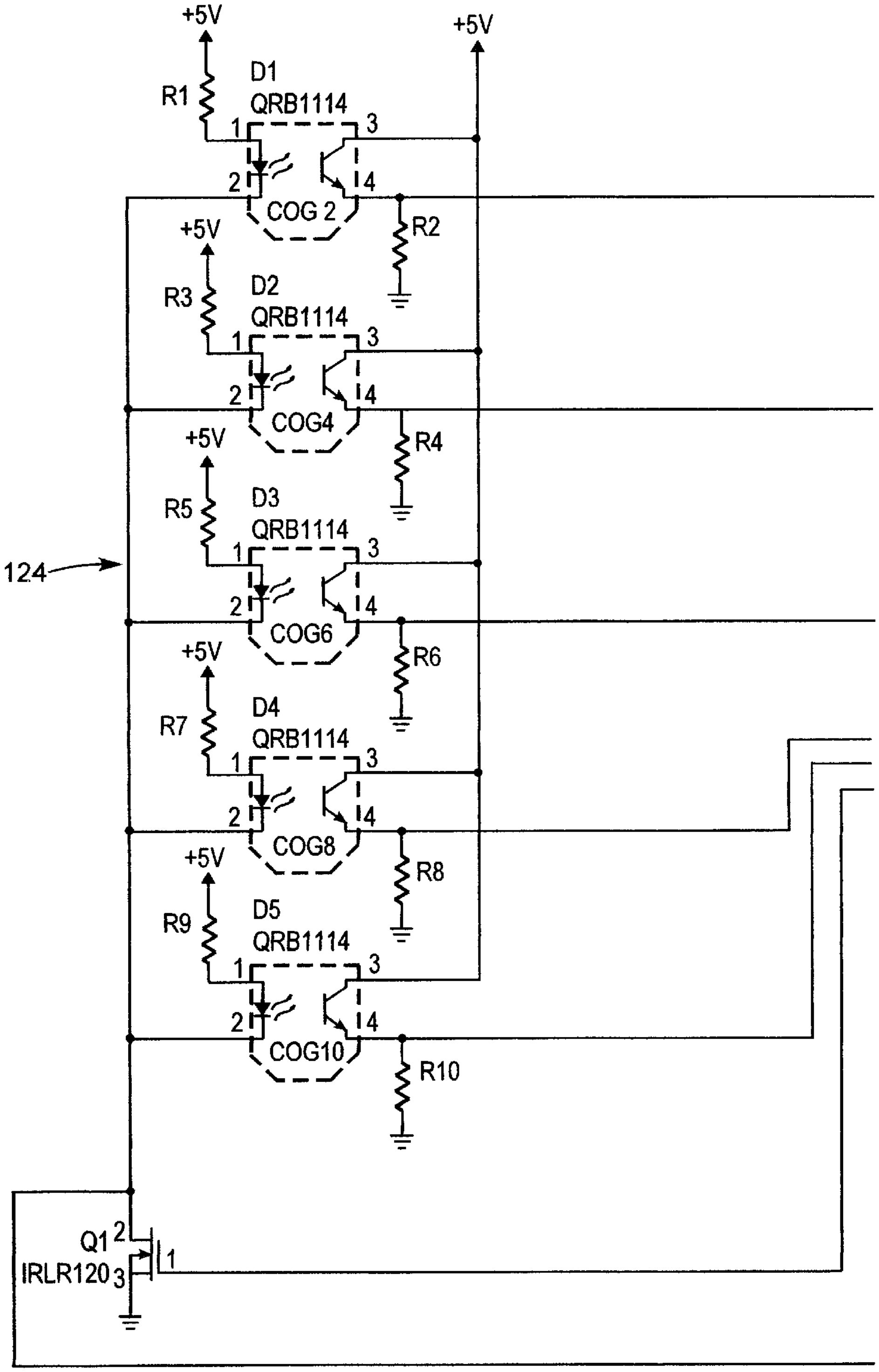
Figures 2, 9A:
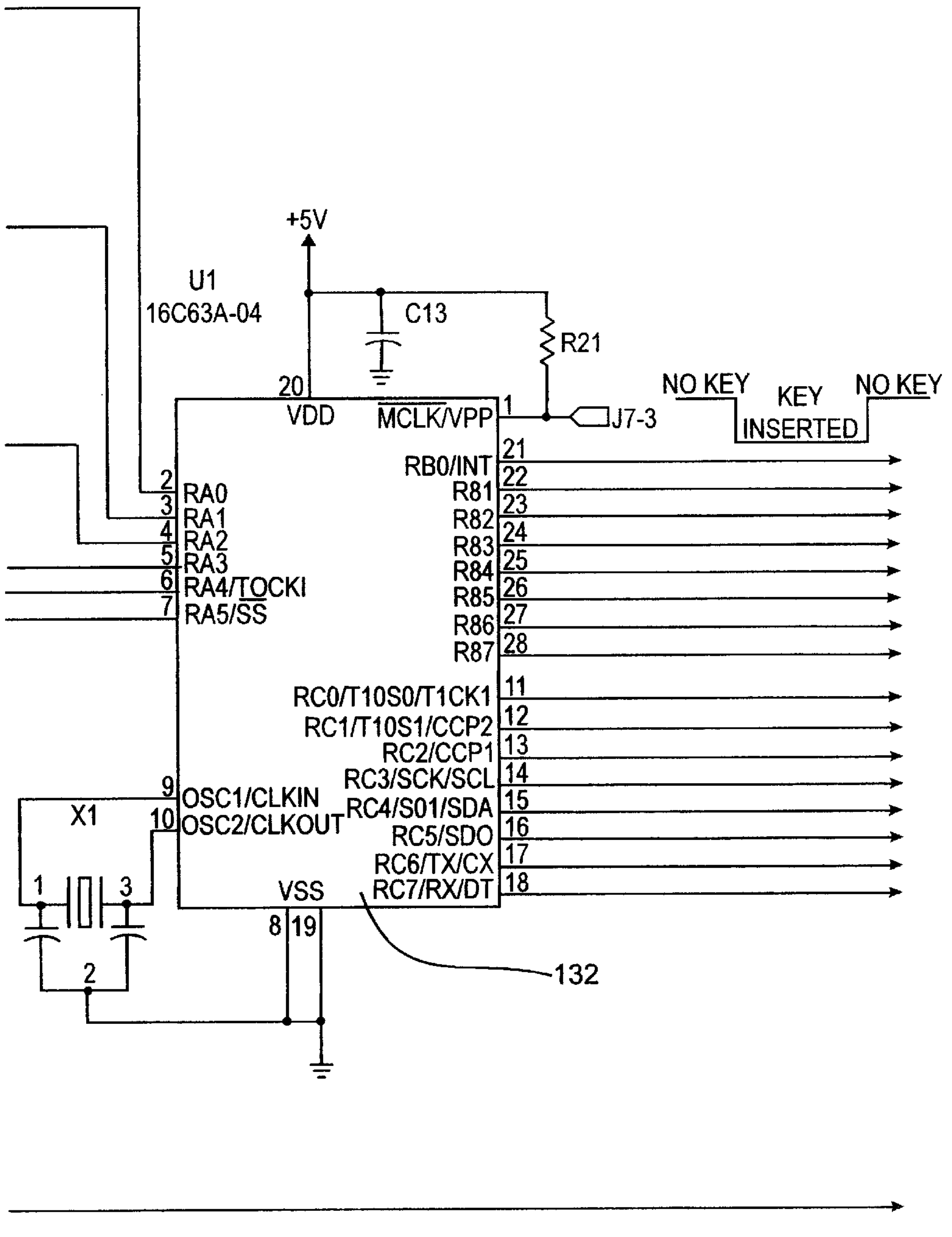
Figures 1, 9B:
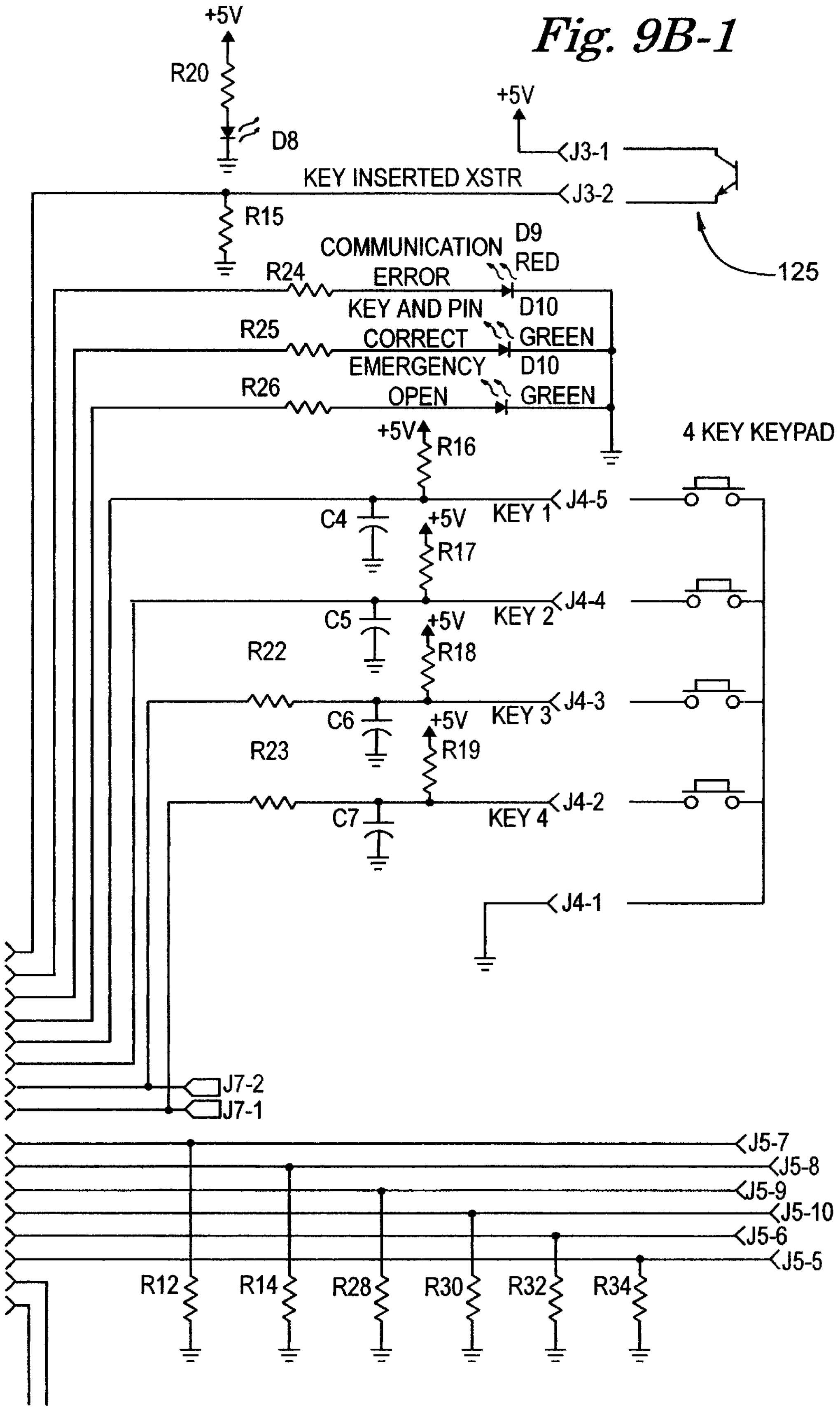
Figures 2, 9B:
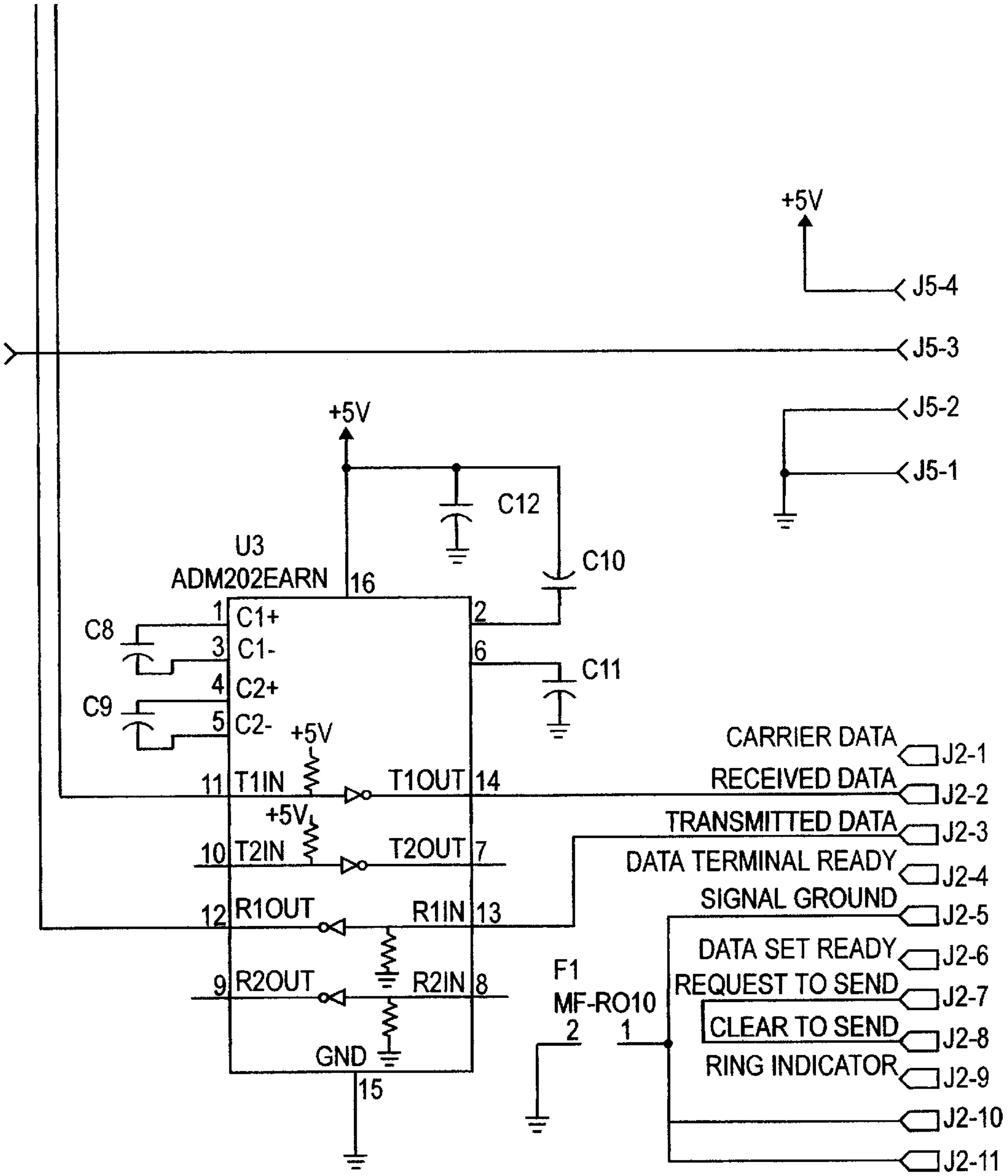
Figure 9C:
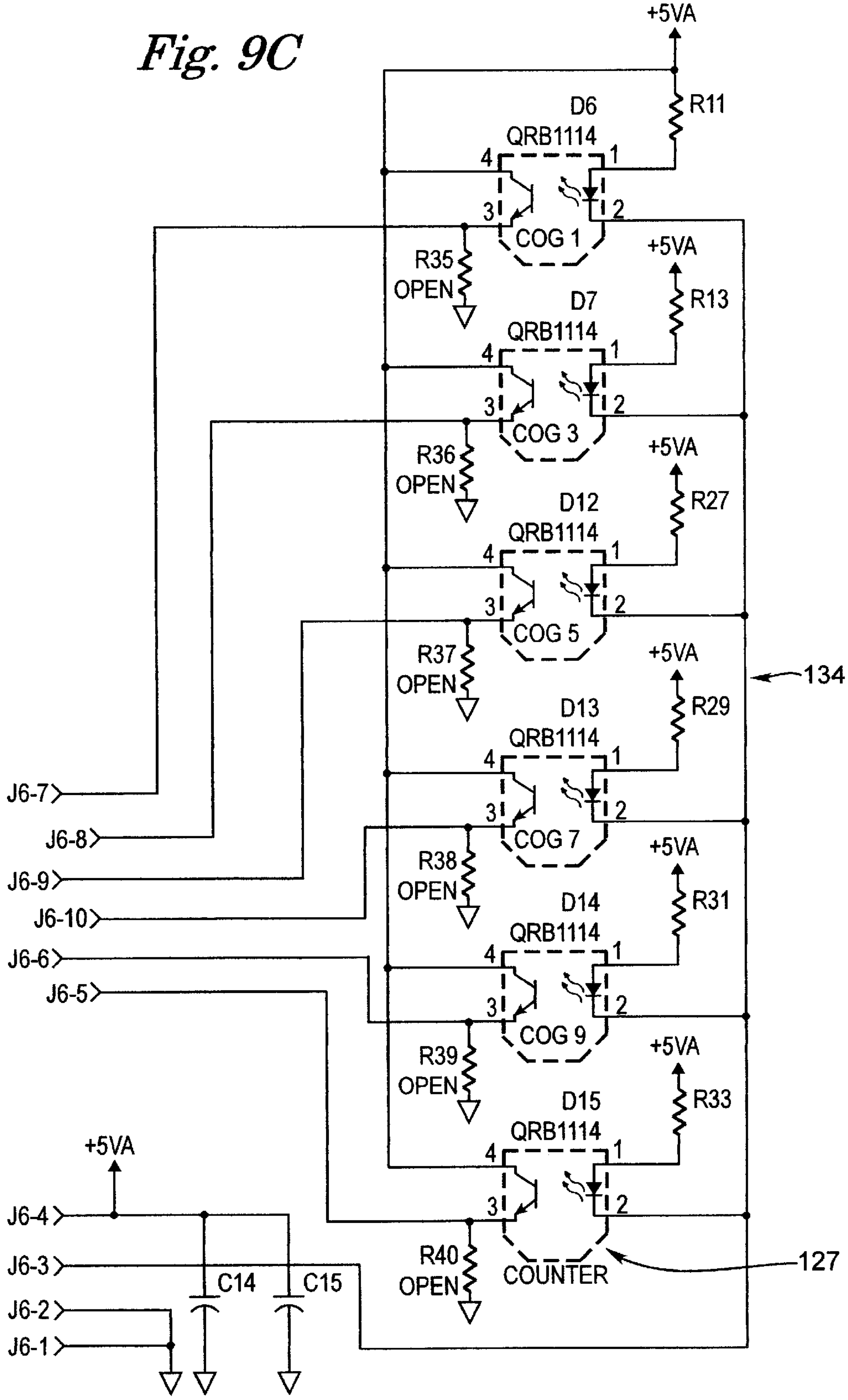

Referring to FIGS. 1, 2, and 8, the controller 30 generally comprises a first circuit board 32 and a second circuit board 34 mounted to the outside of the lock housing 20, within the system housing 22. The first circuit board 32 includes a plurality of sensors 124, a communication port 128, control circuitry 130, and an on-board processor 132. The second circuit board 34 includes a plurality of sensors 134 and controller lines for communication with the first circuit board 32. FIGS. 9A–9C combined show the circuit diagram for one embodiment of the controller 30. One of the plurality of sensors from one of the circuit boards 32, 34 is designated as the key trigger sensor 125 and another is designated as a total rotation sensor 127, as shown in FIG. 3. The remaining of the plurality of sensors 124, 134 are aligned to read the changes of state of the discs 52 through the plurality of sensor apertures 114. Preferably, the sensors 124, 134 are aligned for reading changes of state from a corresponding group of notches and lands 60A, 60B. For instance, sensors 124 can be aligned to read the changes of state associated with the rotation of group 60A, and sensors 134 aligned for the reading of the changes of state for group 60B, or vise versa. It will be understood by those skilled in the art that other variations of this grouping can be employed without deviating from the spirit and scope of the present invention. Referring again to FIGS. 8–9C, the key trigger sensor 125 is comprised of distinct infrared emitting diode (IED) and phototransistor parts for reading of a designated triggering segment 146 of the key 40. Each of the distinct components are located opposing each other at end portions of the trigger aperture 120. The remaining sensors 124, 134 are reflective object sensors having both an IED and a phototransistor built into the sensors 124, 134 for communication with the processor 132. The optimal reflective distance from the surface of the sensors 124, 134 to the reading surface of the discs 52 is approximately 0.15 inches. It will be understood by those skilled in the art that other reflective sensors and configuration parameters can be substituted for the disclosed sensor specifics without deviating from the spirit and scope of the present invention. The communication port 128 in a preferred embodiment is a RS232 serial port. Additionally, USB, infrared, parallel, SCSI, RF, USART, and a myriad of other accepted communication protocols can be implemented in other embodiments.

Referring to FIG. 7, the at least one key 40 includes a handle portion 138, and an operating portion 142. The operating portion 142 comprises a plurality of angular segments 144, a triggering segment 146, and a counting segment 148. The angular segments 144, the triggering segment 146, and the counting segment 148 can be positioned differently on the key depending on the desired alignment with the discs 52, the trigger sensor 125, and the disc designated for rotation counts, respectively. The segment locations disclosed in the figures and this description are envisioned for a preferred embodiment and are not intended to limit the scope of the present invention. The key 40 can be constructed of aluminum, brass, and the like. Other materials are also envisioned. Each of the angular segments 144 is machined to form predetermined angular turning states, with each segment determining the rotation of a corresponding engaged disc of the plurality of discs 52. The angular states are preferably oriented at 6.5 degree increments. The triggering segment 146 is located such that it aligns with the trigger sensor 125 upon a substantially complete engagement of the key 40 into the key aperture 58. The counting segment 148 is located such that it aligns with a disc 53 designated for rotation count and the corresponding total rotation sensor 127. The counting segment 148 is substantially non-angular to permit complete rotation of the corresponding disc to provide a count of the total rotational movement of said disc. It will be understood by those skilled in the art that other sized discs 52, angular cuts on the key 40, and/or other size, angular, and dimension changes could be made to the present invention to alter the potential sensing parameters for the changes of state and rotation of the discs 52 without deviating from the spirit and scope of the invention.

In operation, an end user inserts the key 40 through the key opening 118 of the lock housing 20 and into the key insertion aperture 58 of the lock assembly 10 such that the operating portion 142 of the key 40 is in rotational alignment with the plurality of discs 52. At the position of complete engagement, each of the angular segments 144 is aligned with a corresponding one of the discs 52, the counting segment 148 is aligned with the one disc 53 designated for counting rotational movement of the key 40, and the triggering segment 146 is aligned with the trigger sensor 125. Once engaged, the trigger sensor 125 detects key 40 insertion. The phototransistor for the trigger sensor 125 is on until the key 40 blocks the infrared path between the IED and the phototransistor. At the moment of path blockage the phototransistor is turned off and communication is made to the processor 132 and the input/output line to the processor 132 goes low. Without this complete engagement detection by the trigger sensor 125 and the processor 132, rotational movement of the discs 52 will not be acknowledged by the processor 132.

In one embodiment, the size of the infrared sensors 124, 134 are such that they are generally larger than the thickness of any one of the discs 52, as shown in FIG. 2. Consequently, the notches 60 and lands 62 are grouped into groups 60A and 60B and separated by the intermediate portion 72 such that each group of sensors 124, 134 reads from a corresponding group of notches and lands, as shown in FIG. 5. Generally, only one group of sensors, i.e., sensors 124 or 134, will read changes of state from one group of notches and lands per disc, i.e., groups 60A or 60B. In another embodiment, smaller reflective sensors could be implemented for sequential one-to-one alignment with the discs 52. In this alternative embodiment, multiple groups of notches and lands on any one of the discs 52 could be read to further increase the possible changes of state counts.

Rotation of the key 40 is capable of rotating the engaged discs 52 a maximum rotatable distance allowed by the start and stop positions of the interacting pin 54 and groove 66. The angular segments 144 and the counting segment 148 of the key 40 dictate the allowable rotatable movement of each of the engaged discs 52 within the maximum rotatable distance controlled by the pin 54 and the arc 67 of the groove 66. The 6.5 degree increment cut of a segment substantially corresponds to the rotatable movement from one notch 60 to one land 62, or vise versa. Further, the incremental angular states each define the rotatable movement between a notch 60 and land 62. The larger the machined angular cut of a particular segment, the shorter the rotational movement of the corresponding engaged disc upon rotation. For instance, a substantially non-angular segment will immediately engage the corresponding disc 53 upon rotation to permit complete rotation of that disc 53 with a maximum rotation of the key 40, thus passing each of the grouped notches 60 and lands 62 in front of the corresponding sensor. Similarly, a segment with a large angular cut will not immediately engage the disc upon rotation of the key 40, and will thus only move a reduced number of notches 60 and lands 62 in front of the corresponding sensor with a complete rotation of the key 40.

Each sensor 124, 125, 127, 134 is in operable communication with the processor 132 through a distinct input/output line. As the notches 60 and lands 62 pass in front of the corresponding aligned sensor, the signal to the processor 132 changes. When the reflective surface of a land 62 passes in front of the sensor the output to the phototransistor is turned on and the input to the processor 132 is high. When the non-reflective surface of a notch 60 passes in front of the sensor, the output to the phototransistor is turned off and the input to the processor 132 is low. The cumulative high and low signals to the processor 132 for each sensor are stored in memory and define the changes of state count for a particular rotated disc as read by a corresponding sensor. Consequently, this results in a possible combination count for the lock of 24.9 billion. Those skilled in the art will understand that different combination counts can be arrived at by following variations and embodiments described herein and known to those skilled in the art.

The substantially non-angular counting segment 148 of the key 40 is preferably distal from the handle portion 138. This counting segment 148 will substantially rotatably move the corresponding disc a complete rotation such that all of the notches and lands of one of the groups 60A, 60B pass in front of the total rotation sensor 127. This allows the processor 132 to monitor whether or not a complete rotation of the key 40 has occurred. If a complete rotation has not been detected by the rotation sensor 127 the processor 132 will flag an erroneous key rotation and will not permit an unlock signal, regardless of the changes of state counts received from the sensors 124, 134. This denied unlock signal will be the generated command lock signal for this improper rotation.

The processor 132 can be programmed to perform the database comparison and processing functions of a processing system in accordance with an optic security system 159, as described herein. The processing system is where the database comparison functions are performed. The data from the sensors 124, 127, 134 is compared with a database of the changes of state counts corresponding to each individual accepted and programmed key 40. The changes of state counts for acceptable keys 40 are programmed and compared to the cumulative changes of state received from the sensors 124, 127, 134 upon complete rotation. If the changes of state data from the rotation sensor 127 is acceptable and the changes of state data from the sensors 124, 134 aligned with each corresponding disc match those data values stored in the processing system, the processor 132 in this embodiment, for an acceptable key, the processor 132 outputs an unlock signal. In one embodiment, the keys are programmed, a database is maintained, and processing is done at this on-board processor 132. Such a processor 132 could store and maintain one-time values for a limited number of acceptable keys, or preferably, will be reprogrammable with the use of flash ROM technology built into the processor 132. It is envisioned that other reprogrammable microprocessor technology understood by those skilled in the art can be utilized as well. The addition or subtraction of keys and their assigned changes of state counts is possible with such a reprogrammable processor 132. In another embodiment, as will be discussed in greater detail herein, predetermined storing and processing functions of the processing system, and the overall security system 159, are performed by an external remote processing device 160 operably linked to the controller 30 of at least one lock 10 via the communication port 128.

Optical Security System

In the optic security system 159, it is possible to do the comparison and database processing functions at the processor 132. Alternatively, it is possible to operably incorporate the external remote processing device 160. This remote processing device 160 will generally be any computer system such as those most commonly understood in the art to run common, and specialized, software programs for database maintenance, communication routines, and the like. This external processing device 160 is remote to the security lock 10 and is capable of maintaining and controlling communication data links with a plurality of the communication ports 128 of a plurality of individual locks 10.

The external processing device 160 generally has a powerful microprocessor, memory, input/output lines, a reprogrammable data storage device, and a display for increased data input and output, comparison functions, and database control routines. The display can further include a plurality of displays. For instance, one display could be in operable communication with the lock 10, at the physical location of said lock 10. In addition, or as an alternative to this display location, a display can be at the location of the remote processing device 160. The use of this external processing device 160 not only provides an opportunity to increase the functions of the individual locks 10 in comparison to the on-board processor 132, but it also provides a centralized and universal control sight for monitoring, communicating to, maintaining, and controlling each and every linked optic security lock 10. When one centralized remote processing device 160 is linked to multiple locks, each lock 10 will be assigned an identification number to be transmitted with data in the system 159 whereby database processing and programming can be individualized for each lock 10. This identification number will be stored in the processor 132 of each lock 10 and transmitted through the port 128 by the controller 30.

Figure 10:
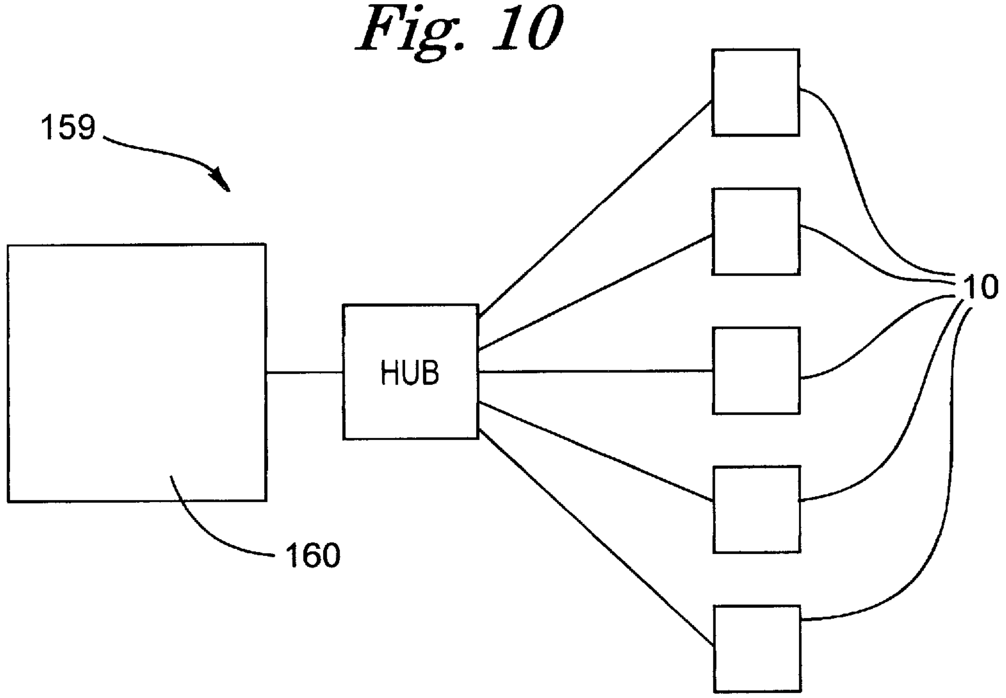
FIG. 10 is a block diagram of one embodiment of the security system in accordance with the present invention.
Figure 11:
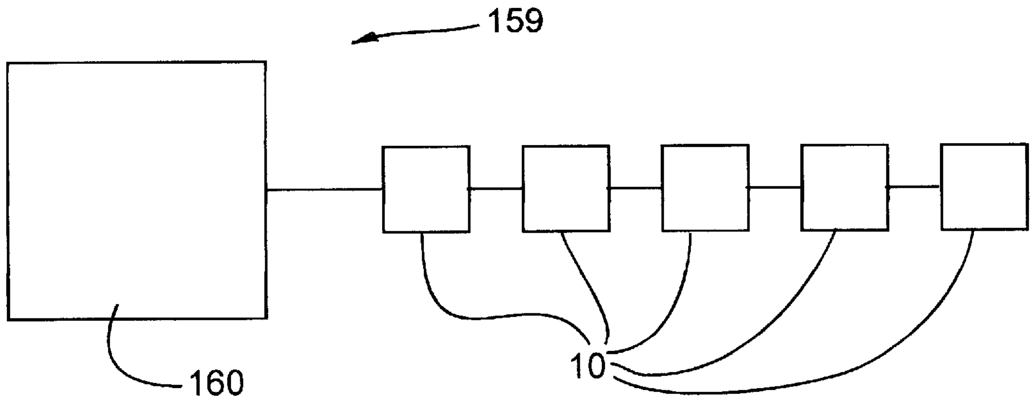
FIG. 11 is a block diagram of one embodiment of the security system in accordance with the present invention.

There are numerous methods and techniques which can be implemented for establishing communication between the centralized processing device 160 and a plurality of the individual locks 10 FIG. 10 demonstrates the use of a hub topology, whereby each operably connected lock 10 is in communication which the remote device 160 through the hub. In addition, FIG. 11 demonstrates a sequentially linked communication system, whereby communication between the operably connected locks 10 and the remote device 160 is facilitated by the continuous connections between each of the locks 10 and the one central remote device 160. Each individually identified lock 10 serves essentially as a relay for data to and from locks 10 further down the communication chain from the remote device 160. Other communication topologies understood for transmitting data between a centralized device and a plurality of remote devices are envisioned as well and can be implemented without deviating from the spirit and scope of the present invention. RF, and various accepted wired networking techniques are additionally envisioned. Each of these communication techniques and topologies is generally made possible by the individual identification numbers assigned to, and transmittable to and from, each of the locks 10 within the security system 159.

Generally, if the external processing device 160 is implemented, the processor 132 on the security lock 10 will perform minimal comparison database functions, and will instead serve primarily as a data receptacle for communication on to the processing device 160 for further processing. In such a configuration, the acceptable key 40 changes of state data is programmed and reprogrammed into the remote processing system 160 rather than the on-board processor 132. The processor 132 accepts and records in memory the changes of state data from an inserted key upon complete rotation, and communicates this data to the processing device 160. The device 160 then searches the database to determine whether or not the key 40 read at the lock 10 is an acceptable key within the device 160 database. If the key is not in the database, a key denial signal is sent back to the lock 10 as the lock command signal, which in turn, will not output an unlock signal, but rather a key failure signal for use in denying access.

In one embodiment, the system 159 will include a keypad device 164 in operable communication with the lock 10, as shown in FIGS. 12A–12B. Preferably, the keypad 164 is attached to the housing 22 of the lock 10. This keypad 164 is generally on the outer portion of the housing 22 whereby access to the key aperture 58 and the keypad 164 is available. Alternatively, the keypad 64 can be remotely mounted or in close proximity to the lock 10. The keypad 164 can be utilized with both the processor 132 based system, or the system utilizing the external device 160 by way of a communication link to the controller 30 of the lock 10. The keypad 164 can utilize a myriad of key digits. In a preferred embodiment, the number of physical key digits is four, as illustrated in the figures.

For ease of explanation, the availability of both of the unique processing devices of the processing system (processor 132 and processing device 160) will be assumed and the use of either will be implicated in the design of the explained system 159. In such a system 159 it is necessary for the end user to correctly utilize an acceptable key 40. Additionally, it may be required that the end user also input an acceptable pin code within a predetermined acceptable time limit. Comparison database routines are used for both checks.

Figure 13A:
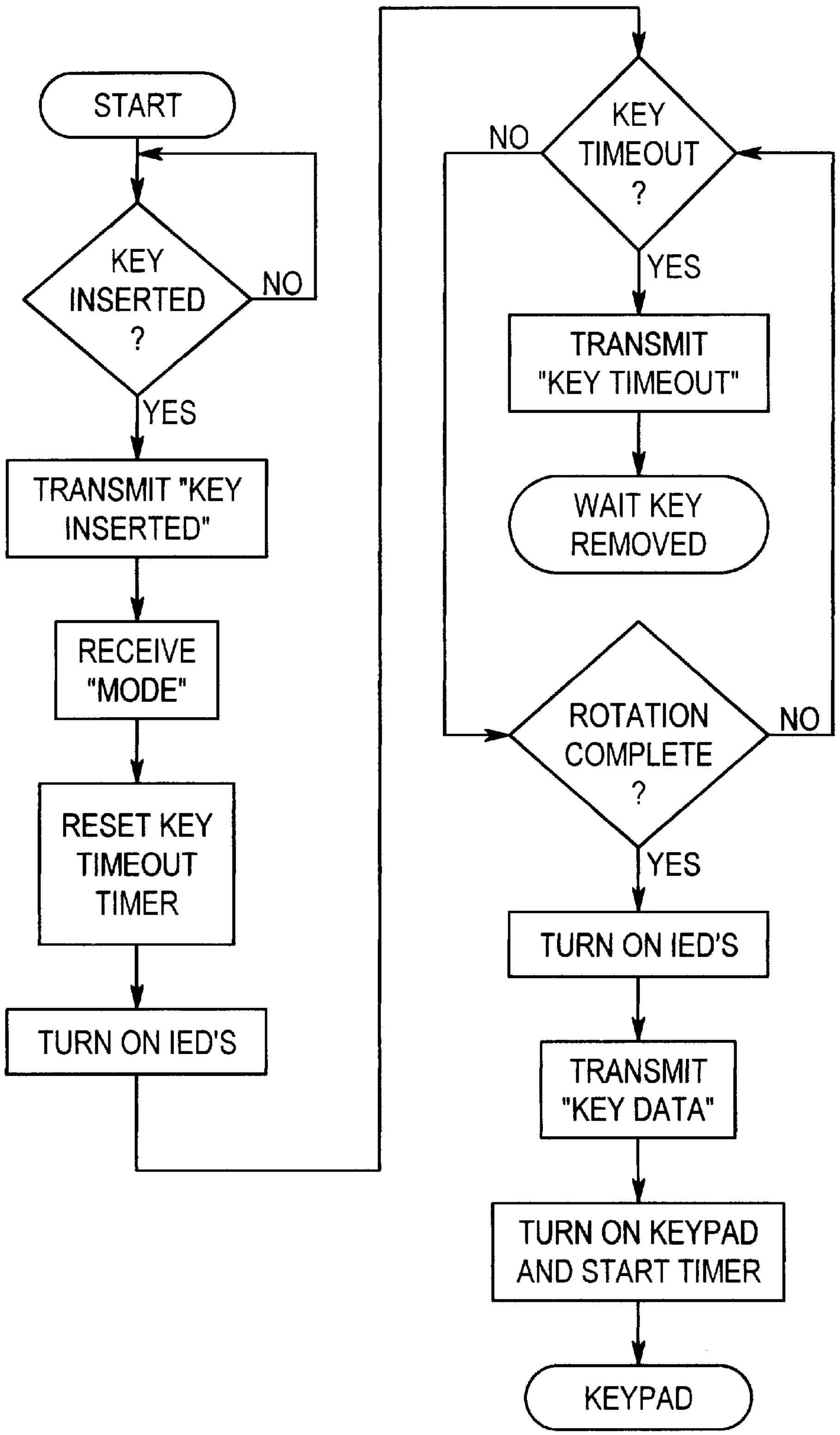
FIG. 13 is a flow chart of one process of operation for a security system in accordance with the present invention.
Figure 13B:
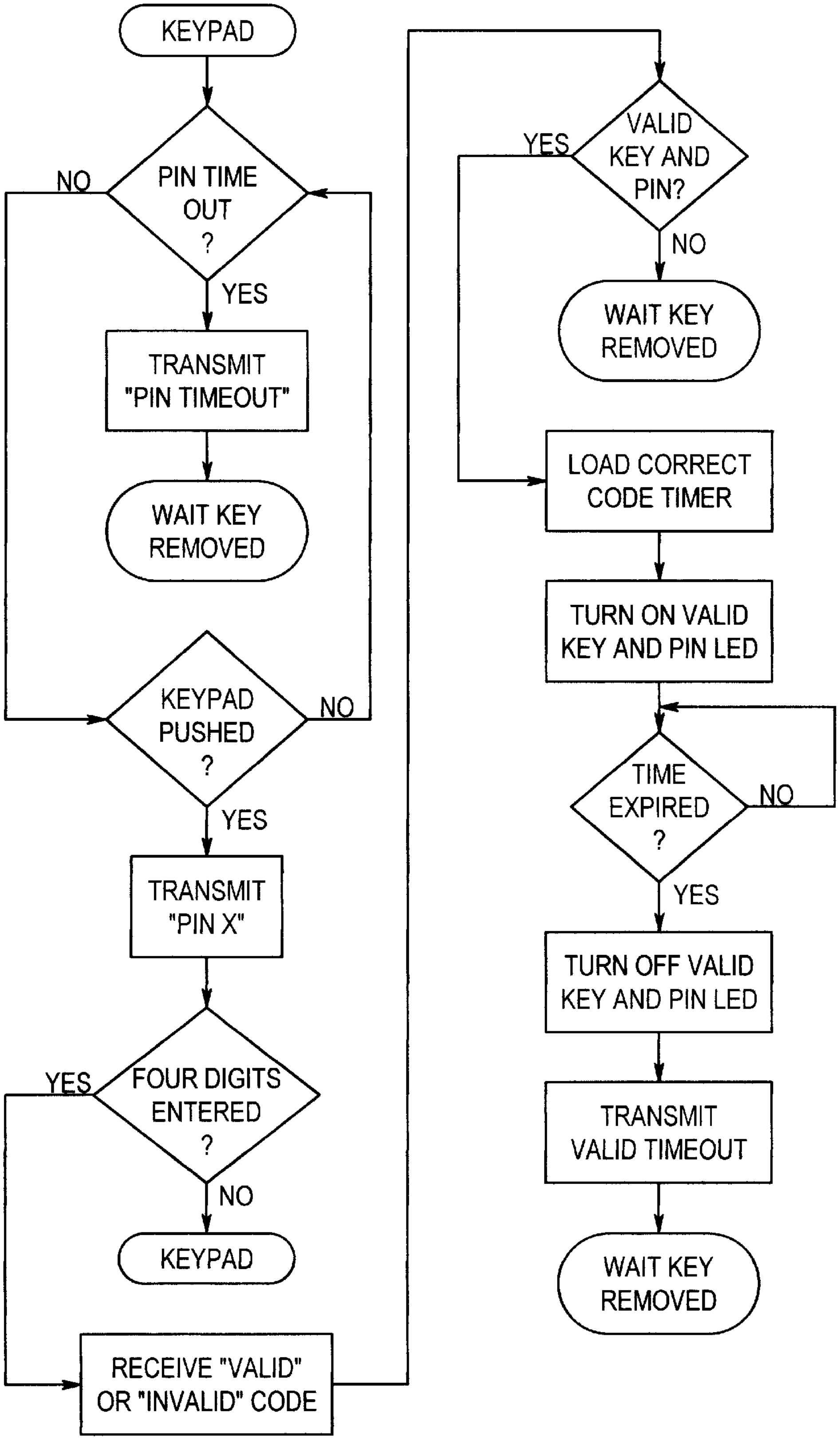
Figure 13C:
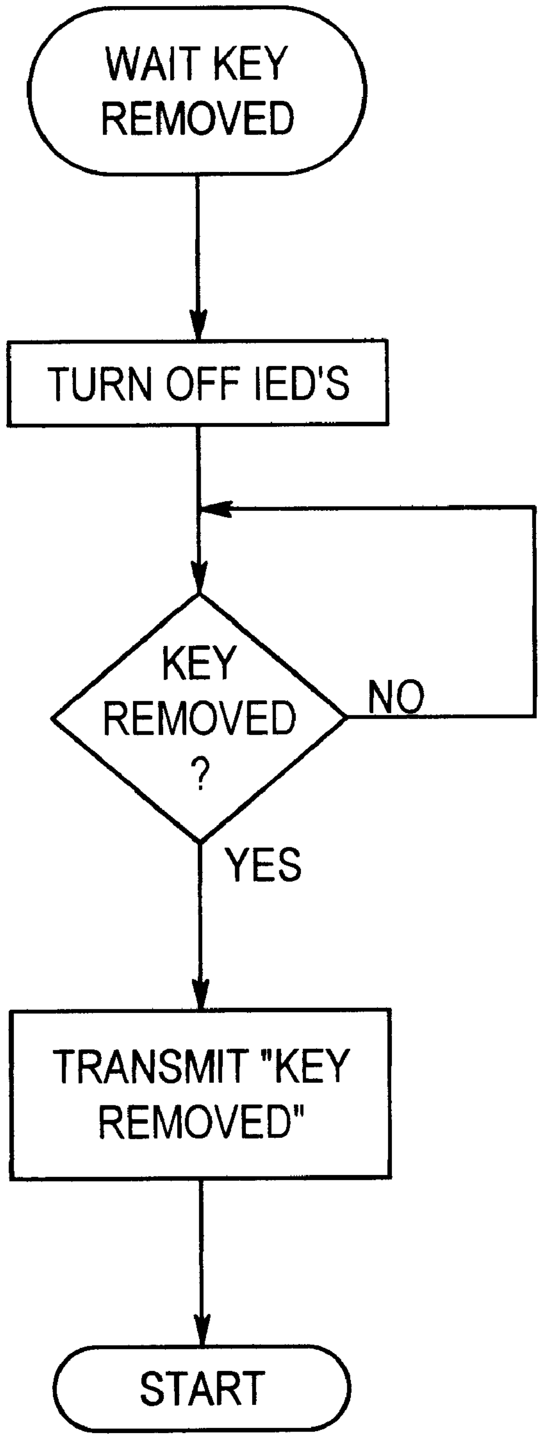

Referring to FIG. 13, the following is a preferred procedural description of the steps taken to verify key and/or keypad 164 inputs for generating an appropriate lock command signal at the lock 10 based on the processing functions of the system 159. Variations on these procedural steps can be implemented without deviating from the spirit and scope of the present invention. First, the lock 10 verifies that a key 40 has been inserted by reading data from the trigger sensor 125. If a key 40 has been properly inserted/engaged within the lock assembly 12, the IEDs on the sensors 124, 134 are turned on for reading infrared radiation associated with the changes of state of the disc 52 rotations. At this point, the controller 30, and the processor 132 in particular, is placed in receiving mode, for receiving changes of state data. If the key 40 is not fully turned within a predetermined time period, a timeout error is initiated by the lock 10 and further processing of a late key turn is denied. The total rotation sensor 127 reads the changes of state on the disc designated for counting key 40 rotations to determine proper rotation of the key 40. At the point of improper key 40 rotation, the key 40 must be removed and reinserted to restart the rotation detection process.

If a complete proper rotation has been detected by the rotation sensor 127, the accumulated data stored is either transmitted by the processor 132 to the remote device 160 or is self-processed by the processor 132. Regardless, the data, transmitted or self-processed, is either compared to a database of acceptable keys 40, or it is stored for further database comparisons if a keypad 164 entry is required. If a keypad 164 entry is required in an embodiment of the system 159 requiring key 40 and keypad 164 input, another predetermined timeout period is triggered. The keypad 164 entry must be inputted during this time period or else a timeout error occurs.

If the keypad 164 entry is received in time, the PIN numbers entered into the physical pad are stored. Verification routines are processed within the database program. For instance, it may be necessary to identify that the correct number of keystrokes have been inputted, that the entry is coming at an approved time of day, that the input for that particular lock does not have specifically flagged unlock disapproval, and the like. Once the keypad entry is accepted and verified, the keypad entry data and the rotated key data (i.e., changes of state data for each disc 52) are compared with the known database values in either the controller 30 or the remote processing device 160. If the key 40 data alone is being processed in a system 159, then the comparison will only take into account a comparison between the key 40 changes of state data from the sensors 124, 134 and the known acceptable keys in the processing system database. For each embodiment, various verification criteria can be implemented. For instance, the processing system may limit the number of failed attempts to three. Other security verification routines can be utilized by the reprogrammable processing system.

If the comparison at the database is valid, meaning that the key 40 data, or the key 40 data and the keypad 164 data, are correct and acceptable values within the database, then an unlock signal is outputted as the lock command signal. In one embodiment the removal of the key 40 from the security lock 10 will end the unlock signal and require restarting the process. In another embodiment, it will be required that the key 40 be removed after the database comparison is found valid, before an unlock signal is outputted.

It will be understood to those skilled in the art that a database can be created for storing the key 40 changes of state data and/or the keypad 164 entry data at either the microprocessor 132 or in the remote processing device 160. With such a database it will be possible to keep track of the last time a key 40 was used, the number of times a key 40 was used, the erroneous attempts to use a particular lock 10, the erroneous keypad 164 entries attempted with a particular key 40, and the like. This data can be used to better understand the operation of the system and provide further security assistance and protection. Moreover, additional database comparison and processing functions can be programmed in the processing system without deviating from the spirit and scope of the present invention.

The database can be programmed in numerous ways. Specifically, in those systems 59 utilizing the processor 132 and the controller 30 to perform the processing tasks, the database can be programmed with the use of a remote computing device such as a laptop that can communicate with the controller 30 through the communication port 128. In the system 159 utilizing a remote processing device 160, programming can take place at the remote processing device 160 such that each of the plurality of connected locks 10 is identified in one central database, or in individual databases for each operably connected lock 10.

Figure 14:
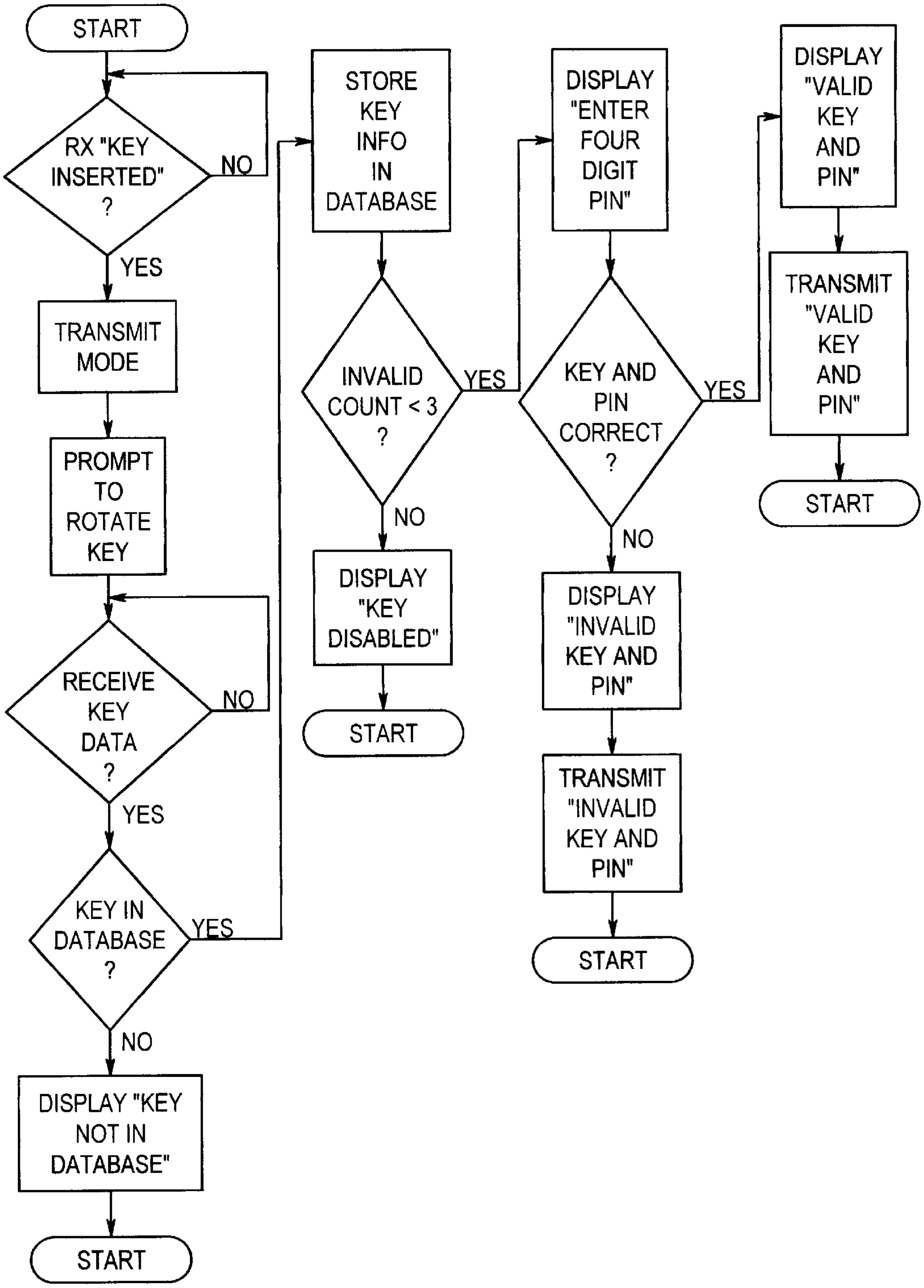
FIG. 14 is a flow chart of one process of programming a database for a security system in accordance with the present invention.

Referring to one acceptable database programming technique shown in FIG. 14, a key 40 is inserted into the lock 10, the key 40 is rotated, and the changes of state data for that key 40 is stored in the corresponding database. Keys that have been acknowledged as acceptable database entries can be later removed or disabled from the database. In a system 159 where a keypad 164 is incorporated, a keypad 164 entry is inputted upon prompting, after the reading of the key 40 data. That keypad 164 PIN is linked in the database to that particular key 40 for future comparison routines. It will be understood by those skilled in the art that input verifications, programming steps and techniques, and other software safeguarding procedures for programming the database can be added to the steps defined herein without deviating from the scope and spirit of the present invention.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An optical security lock comprising:

at least one key for engaging the optical lock whereby the at least one key includes a plurality of angular segments;

a plurality of rotatable discs, each disc capable of receiving the at least one key such that each of the angular segments of the at least one key defines a rotatable movement of one corresponding disc upon maximum allowable turning of the key;

a plurality of reflective infrared counting sensors whereby the sensors count the rotatable movement of a predetermined plurality of the discs by sensing surface changes of state of the discs; and a mountable controller having at least one microprocessor in operable communication with each of the sensors whereby the processor communicates instructions to the sensors and processes data received from the sensors.

2. The optic security lock of claim 1, wherein the at least one key has at least 10 angular segments.

3. The optic security lock of claim 1, wherein the rotatable movement of each of the plurality of discs is less than 65 degrees.

4. The optic security lock of claim 1, wherein each of the plurality of reflective optic counting sensors are unitary bodied infrared reflective sensors having a light emitting diode and a phototransistor for sensing rotation of the discs.

5. The optic security lock of claim 1, wherein the surface changes of state of the discs are defined by a plurality of notches and lands for each of the plurality of discs.

6. The optic security lock of claim 1, wherein the plurality of reflective optic counting sensors are dividedly grouped into a first sensor group and a second sensor group, each of the groups having a predetermined plurality of the sensors less than the total plurality of sensors.

7. The optic security lock of claim 6, wherein the first sensor group and the second sensor group are distally separated such that each of the sensor groups sense surface changes of state at distally separated regions of the discs.

8. The optic security lock of claim 1, wherein the microprocessor is reprogrammable.

9. The optic security lock of claim 1, wherein the microprocessor compares at a reprogrammable database the data stored in memory from the sensors with programmed key data to generate a lock command signal.

10. An optic security system comprising:

at least one key including a plurality of angular segments;

at least one security lock having

- a plurality of rotatable discs, each disc capable of receiving the at least one key such that each of the angular segments of the at least one key defines a rotatable movement of one corresponding disc upon maximum allowable turning of the key;
- a plurality of reflective infrared counting sensors whereby the sensors count the rotatable movement of a predetermined plurality of the discs by sensing surface changes of state of the discs; and
- a mountable controller having at least one microprocessor in operable communication with each of the sensors whereby the processor communicates instructions to the sensors and processes changes of state data received from the sensors; and a processing system in operable communication with the controller whereby the processing system processes changes of state data in a database and communicates a generated lock command signal to the controller.

11. The security system of claim 10, wherein the processing system is included in the at least one microprocessor of the mountable controller.

12. The security system of claim 10, wherein the processing system is a remote external processing device.

13. The security system of claim 10, further comprising a communication port for communication between the at least one lock and the remote external processing device.

14. The security system of claim 10, further comprising a keypad in operable communication with the processing system and the controller, with an entry on the keypad being processed in generating the lock command signal.

15. An optical security system comprising:

at least one key having a plurality of angular segments;

at least one lock means having a plurality of rotatable discs, each disc capable of receiving the at least one key such that each of the angular segments of the at least one key defines a rotatable movement of one corresponding disc upon a maximum allowable turn of the key;

a plurality of sensing means whereby the sensing means count the rotatable movement of a predetermined plurality of the discs by sensing surface changes of state to the discs; and controlling means in operable communication with each of the sensing means for communicating instructions to the sensing means and processing changes of state data received from the sensing means; and processing means in operable communication with the controlling means whereby the processing means processes changes of state data in a database and communicates a generated lock command signal to the controlling means.

16. The security system of claim 15, wherein the processing means is included in a microprocessor of the controlling means.

17. The security system of claim 15, wherein the processing means is an external remote processing device.

18. The security system of claim 17, wherein the external remote processing device is a computer in operable communication with the controlling means of the at least one lock means.

19. The security system of claim 15, further comprising a communication port for communication between an external remote processing device and the controlling means of the at least one lock means.

20. The security system of claim 19, wherein the communication port is a serial communication port.

21. The security system of claim 15, further comprising keypad means in operable communication with the processing means and the controlling means, with an entry on the keypad means being processed in generating the lock command signal.

22. A method of generating a lock command signal at an optical security system, comprising the steps of:

inserting a key into a lock housing such that the key is in full engagement with respect to a plurality of discs housed within the lock housing, wherein the key includes angular segments for rotatable engagement with the plurality of discs;

reading signal data from a trigger sensor, whereby the signal from the trigger sensor is processed by a microprocessor to determine if a key has been fully engaged within the housing;

turning the key;

reading signal data from a total rotation sensor and a plurality of counting sensors at the microprocessor, whereby the signal data from the total rotation sensor is processed by the microprocessor to determine whether a complete rotation of one of the plurality of discs occurred; and the signal data from a predetermined plurality of the discs is processed to calculate a change of state count for each of the predetermined plurality of discs, each change of state count determined by the angular segments of the key;

processing the data from the total rotation sensor to determine if a total rotation count has occurred;

processing, if the total rotation count was acceptable, the change of state counts for each of the predetermined plurality of discs to determine if an approved key was used; and generating a lock command signal based on processing comparisons at a processing system database.

23. The method of claim 22, wherein the lock command signal is an unlock signal when the processing comparison at the processing system database determines that the proper total rotation occurred and an approved key was used.

24. The method of claim 22, further including entering a personal identification number into a keypad whereby the keypad entry is considered when processing data and generating the lock command signal.

25. An optic security system comprising:

at least one key including a plurality of angular segments;

at least one security lock having a plurality of rotatable discs, each disc capable of receiving the at least one key such that each of the angular segments of the at least one key defines a rotatable movement of one corresponding disc upon maximum allowable turning of the key;

a plurality of reflective infrared counting sensors whereby the sensors count the rotatable movement of a predetermined plurality of the discs by sensing surface changes of state of the discs; and a mountable controller having at least one microprocessor in operable communication with each of the sensors whereby the processor communicates instructions to the sensors and processes changes of state data received from the sensors;

a keypad including a plurality of key digits for entering a personal identification number, wherein the keypad is in operable communication with the controller; and a processing system in operable communication with the controller whereby the processing system processes changes of state data and the personal identification number entries from the keypad in a database and communicates a generated lock command signal to the controller.

26. The security system of claim 25, wherein the processing system is included in a microprocessor of the controller.

27. The security system of claim 25, wherein the processing system is an external remote processing device.

28. The security system of claim 27, wherein the external remote processing device is a computer in operable communication with the controller of the at least one lock means.

29. The security system of claim 25, further comprising a communication port for communication between an external remote processing device and the controller of the at least one lock means.

30. The security system of claim 29, wherein the communication port is a serial communication port.

31. The security system of claim 29, where in the communication port is capable of communication with any communication device having compatible communication hardware and software protocol.

* * * * *

UNITED STATES PATENT AND TRADEMARK OFFICE

CERTIFICATE OF CORRECTION

PATENT NO. : 6,499,660 B1 
DATED : December 31, 2002
INVENTOR(S) : John H. Moorhouse, Michael A. Bodin and Kurt Larsen It is certified that error appears in the above-identified patent and that said Letters Patent is hereby corrected as shown below:

Column 5,
Line 32, please delete “20” following the word “trigger”.

Column 6,
Line 5, “Referring” should be the start of a new paragraph.

Column 14,
Lines 55 and 59, please delete the word “means”.

Signed and Sealed this

Sixteenth Day of September, 2003

JAMES E. ROGAN
*Director of the United States Patent and Trademark Office*